(12) United States Patent
Glenn et al.

(10) Patent No.: US 7,263,646 B2
(45) Date of Patent: Aug. 28, 2007

(54) METHOD AND APPARATUS FOR SKEW COMPENSATION

(75) Inventors: Robert C. Glenn, Bend, OR (US); Neil P. Kelly, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 703 days.

(21) Appl. No.: 09/752,651

(22) Filed: Dec. 29, 2000

(65) Prior Publication Data

US 2002/0087922 A1   Jul. 4, 2002

(51) Int. Cl.
*H03M 13/00* (2006.01)
*G11C 29/00* (2006.01)

(52) U.S. Cl. ............... 714/758; 714/805; 714/782; 327/298; 379/399.02

(58) Field of Classification Search ........ 714/700; 370/536, 241; 375/242, 356, 357, 354; 327/270, 327/276, 141; 713/503
See application file for complete search history.

(56) References Cited

U.S. PATENT DOCUMENTS

| | | | | |
|---|---|---|---|---|
| 3,980,826 | A | | 9/1976 | Widmer |
| 4,821,297 | A | * | 4/1989 | Bergmann et al. .......... 375/376 |
| 5,369,640 | A | * | 11/1994 | Watson et al. ............. 714/700 |
| 5,467,040 | A | * | 11/1995 | Nelson et al. ............. 327/276 |
| 5,717,729 | A | * | 2/1998 | Iknaian et al. ............. 375/356 |
| 6,034,558 | A | | 3/2000 | Vanderschoot et al. |
| 6,151,356 | A | | 11/2000 | Spagnoletti et al. |
| 6,178,212 | B1 | | 1/2001 | Akashi |
| 6,226,045 | B1 | * | 5/2001 | Vidovich .................... 348/539 |
| 6,493,320 | B1 | * | 12/2002 | Schober et al. ............ 370/241 |
| 6,496,540 | B1 | * | 12/2002 | Widmer ..................... 375/242 |
| 6,525,577 | B2 | * | 2/2003 | Lee .......................... 327/149 |
| 2002/0085656 | A1 | | 7/2002 | Lee | |

OTHER PUBLICATIONS

Brunetti, J., et al., XIKINX, The LVDS I/O Standard XAPP230 (v1.1) Nov. 16, 1999, pp. 1-6, www.xilinx.com.

* cited by examiner

*Primary Examiner*—Guy J. Lamarre
(74) *Attorney, Agent, or Firm*—Blakely, Sokoloff, Taylor & Zafman LLP

(57) ABSTRACT

A method that measures a skew between a data signal and a clock signal at a receiving end of a serial link and then adjusts a phase relationship between the data signal and the clock signal to reduce the skew.

25 Claims, 5 Drawing Sheets

METHOD AND APPARATUS FOR SKEW COMPENSATION

FIELD OF THE INVENTION

The field of invention relates to data signal processing generally; and more specifically, to compensating for the skew that exists between a clock signal and a data signal.

BACKGROUND

FIG. 1 shows a pair of semiconductor chips 101, 102 coupled together by a serial link 110 having a data signal line 103 and a clock signal line 104. The transmitting unit 101 sends a tx data signal 105 to the receiving unit 102 along tx data signal line 103. The receiving unit 102 uses a tx clock signal 106 that is sent along tx clock signal line 104 to receive the tx data 105.

That is, in the example of FIG. 1, the receiving unit 102 clocks the tx data signal 105 on the rising edge of the tx clock signal 106. The tx clock signal 106 may be referred to as a quadrature clock because the phase of its rising edges are 90 degrees away from the rising edges of the tx data signal 105 (using the tx data signal 105 as a phase reference).

A problem with serial links, particularly as their frequency of operation rises, is the presence of skew 109 between a tx data signal 107 and a tx clock signal 108 when it is received at the receiving unit. Skew 109 is any phase relationship between the edges of the tx data signal 107 and tx clock signal 108 other than the nominal or "designed for" phase relationship (such as 90 degrees, using the tx data signal 107 as a phase reference).

Skew may arise because the transfer function and/or trace length of the data signal line 103 is different than the transfer function and/or trace length of the clock signal line 104. For example if the data signal line 103 is shorter or has less capacitance than the clock signal line 103, the rising edges of the tx clock signal 108 will have more than 90 degrees of phase shift with respect to the rising edges of the tx data signal 107.

For a given difference in transfer function and/or trace length between the data and clock signal lines 103, 104, greater skew is observed between the tx data signal and tx data signal as the frequency of operation of the serial link 110 increases. That is, the differences between the signal lines 103, 104 have an effect on the delay of the signals as they propagate from the transmitting unit 101 to the receiving unit 102. As the frequency of the serial link's operation rises, the delay represents a greater percentage of the data signal's pulse widths.

As skew 109 increases the performance of the serial link degrades. That is, because the receiving unit 102 uses the tx clock signal to clock the reception of the data carried by the tx data signal 107, the "misposition" of the tx clock signal 108 edges causes the receiving unit 102 to occasionally clock incorrect data.

BRIEF DESCRIPTION OF THE DRAWINGS

The present invention is illustrated by way of example, and not limitation, in the Figures of the accompanying drawings in which.

DETAILED DESCRIPTION

A method is described that measures a skew between a data signal and a clock signal at a receiving end of a serial link and then adjusts a phase relationship between the data signal and the clock signal to reduce the skew. An apparatus is described that includes a transmitting unit coupled to a receiving unit by a serial link where the serial link is configured to transport a clock signal and a data signal. The apparatus also includes a skew measurement unit that is coupled to the serial link such that the coupling of the skew measurement unit is closer to the receiving unit than the transmitting unit. A skew adjustment unit is also coupled to the skew adjustment and the transmitting unit.

Figure 2:
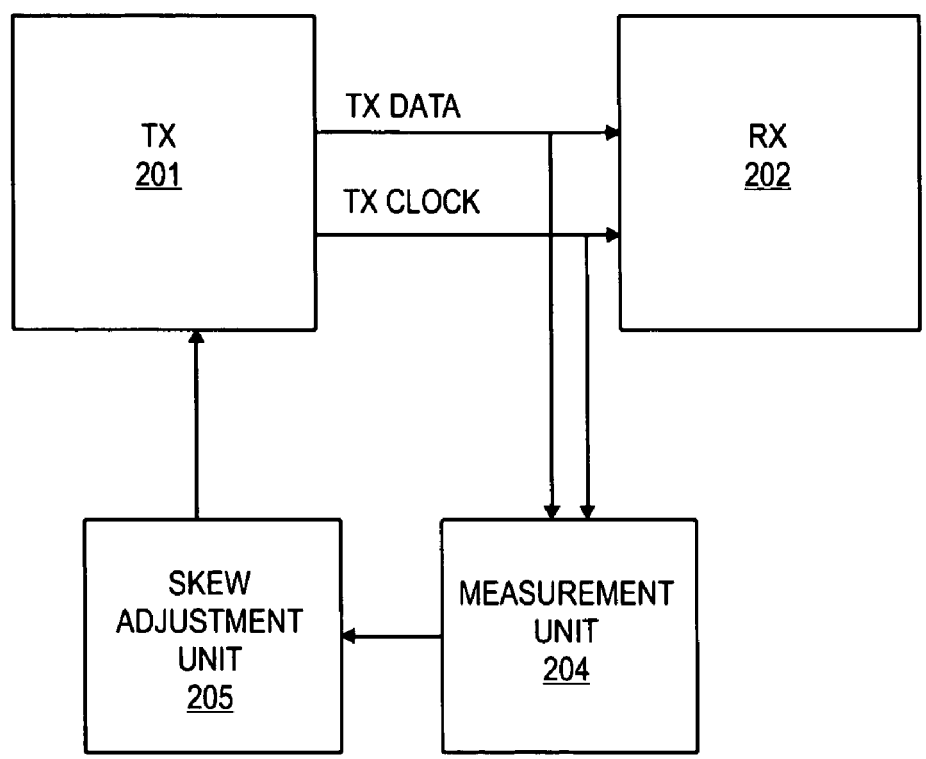
FIG. 2 shows an apparatus that compensates for skew between a data signal and a clock signal.

FIG. 2 shows a solution to the skew problem presented in the background. In the approach of FIG. 2 the skew between a clock signal and data signal, as it appears when observed proximate to the receiving unit 202, is measured by a measurement unit 204 (e.g., an oscilloscope, a network analyzer, a bit error rate tester, a circuit designed to measure skew, etc.).

After the measurement unit 204 measures the skew, the skew is presented to a skew adjustment unit 205. The skew adjustment unit 204 determines a phase relationship between the tx data signal and the rx clock signal within the transmitting unit 201 that will compensate for (i.e., approximately cancel) the skew observed at the receiving unit 202. The skew adjustment unit 204 then implements the proper phase relationship within the transmitting unit 201.

For example, if the skew observed at the receiving unit 202 corresponds to +2 degrees of phase shift (e.g., the tx clock is shifted by 92 degrees with respect to the tx data signal) the skew adjustment unit 204 programs the transmitting unit 201 to effectively install a difference between the delay experienced by the tx data signal and the delay experienced by the rx data signal as they are processed within the transmitting unit 201.

The difference in delay should correspond (or approximately correspond) to a −2 degree phase shift of the tx clock signal with respect to its nominal phase position. That is, whereas a typical transmitting unit 101 transmits a quadrature tx clock signal at a +90 degree phase shift with respect to the tx data signal discussed in the background and seen in FIG. 1, the transmitting unit 201 of FIG. 2 is programmed by the skew adjustment unit 204 to transmit a quadrature tx clock signal having a +88 degree phase shift with respect to the tx data signal.

The skew adjustment unit 204 may be any device that determines the proper programmable phase adjustment settings in light of the skew measured by the skew measurement unit 204. The skew adjustment unit may include a centralized processing unit (CPU) that executes a software program configured to the proper adjustment settings. This includes a stand alone personal computer (PC), an electrical circuit board having a CPU, etc. The skew adjustment settings may also be determined and programmed by an individual rather than automated with a CPU and software.

In an embodiment, the transmitting unit 201 and the receiving unit 202 are implemented within different semiconductor chips. In various embodiments, the transmitting unit 201, the receiving unit 202, the measurement unit 204 and/or the skew adjustment unit 205 may be integrated together on the same semiconductor chip in various combinations. For example, all four units 201, 202, 204, 205 may be integrated together on the same chip. Alternatively, as another example, the skew measurement unit 204 may be integrated onto the same semiconductor chip with the receiving unit 202 and the skew adjustment unit 204 may be integrated onto a different semiconductor chip with the transmitting unit 201.

In an alternate embodiment, rather than measure the skew observed at the receiving unit 202, a favorable tx data signal/rx data signal phase relationship is known for the receiving unit 202. For example, if it is known that the receiving unit 202 operates better if a −2 degree skew (i.e., +88 degree phase relationship) exists at its input (e.g., because of different delays internal to the receiving unit 202 for the two signals), the transmitting unit 201 is programmed by the skew adjustment unit 204 to transmit a quadrature tx clock signal at a −2 degree skew (i.e., a +88 degree phase relationship).

The favorable phase relationship may be provided by the manufacturer of the receiving unit 202. In a further embodiment, both approaches discussed above are simultaneously employed. That is, the transmitting unit 201 is programmed according to both measurement data taken by the measurement unit 204 and a known phase relationship favored by the receiving unit 202

For example if the receiving device favors a −2 degree skew (i.e., a +88 degree phase relationship) and a +2 degree skew (i.e. +92 degree phase relationship) is observed by the measurement unit 204 when the transmitting unit 201 is transmitting at a 0 degree skew (i.e., +90 degree phase relationship), the skew adjustment unit 205 programs the transmitting unit 201 to transmit the tx data signal and tx clock signal at a 4 degree skew (i.e., a +86 phase relationship). In this case, the skew adjustment compensates for both the +2 skew associated with the signal lines between the chips 201, 202 and the −2 skew associated with the phase relationship favored by the receiving unit 201.

Figure 3:
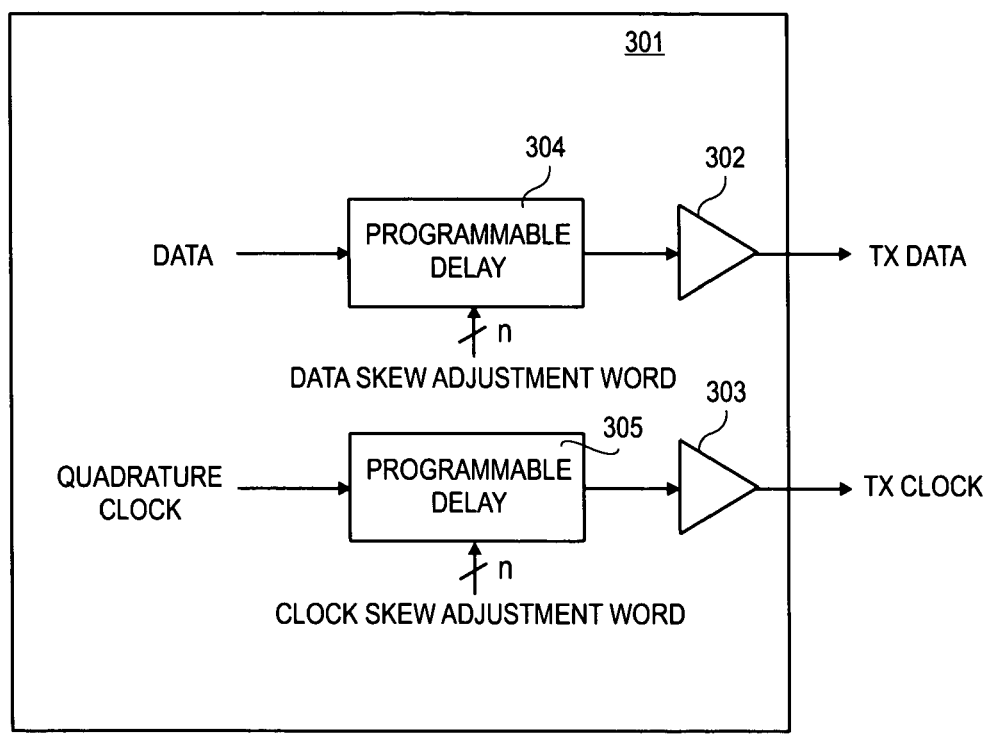
FIG. 3 shows a portion of a transmitting unit having programmable delay units along the tx data signal path and the tx clock signal path.

FIG. 3 shows an embodiment of a design 301 that may be used within the transmitting unit 201 of FIG. 2 to adjust the skew of a tx data signal and a tx clock signal. A pair of programmable delay units 304, 305 are positioned prior to line drivers 302, 303. A programmable delay unit will impart an amount of delay on a input signal based upon the value of a skew adjustment input word.

Thus programmable delay unit 304 imparts a delay upon the data signal based upon the value of the data skew adjustment word and programmable delay unit 305 imparts a delay upon the quadrature clock signal based upon the value of the clock skew adjustment word. The skew between the tx data signal and the tx clock signal is a function of the difference in delay experienced by the signals through their respective programmable delay units 304, 305.

For example if programmable delay unit 304 exerts a 75 ps delay on its input data signal and if programmable delay unit 305 exerts a 75 ps delay on its input quadrature clock signal no skew is tailored between the two signals by the programmable delay units. However, if instead programmable delay unit 304 exerts a 75 ps delay and programmable delay unit 305 exerts a 100 ps delay upon the quadrature clock signal, a −25 ps skew is created between the two signals. Line drivers 304, 305 are circuits that are capable of driving the tx data signal and tx clock signal across their respective signal lines to the receiving unit (not shown in FIG. 3).

Figure 4:
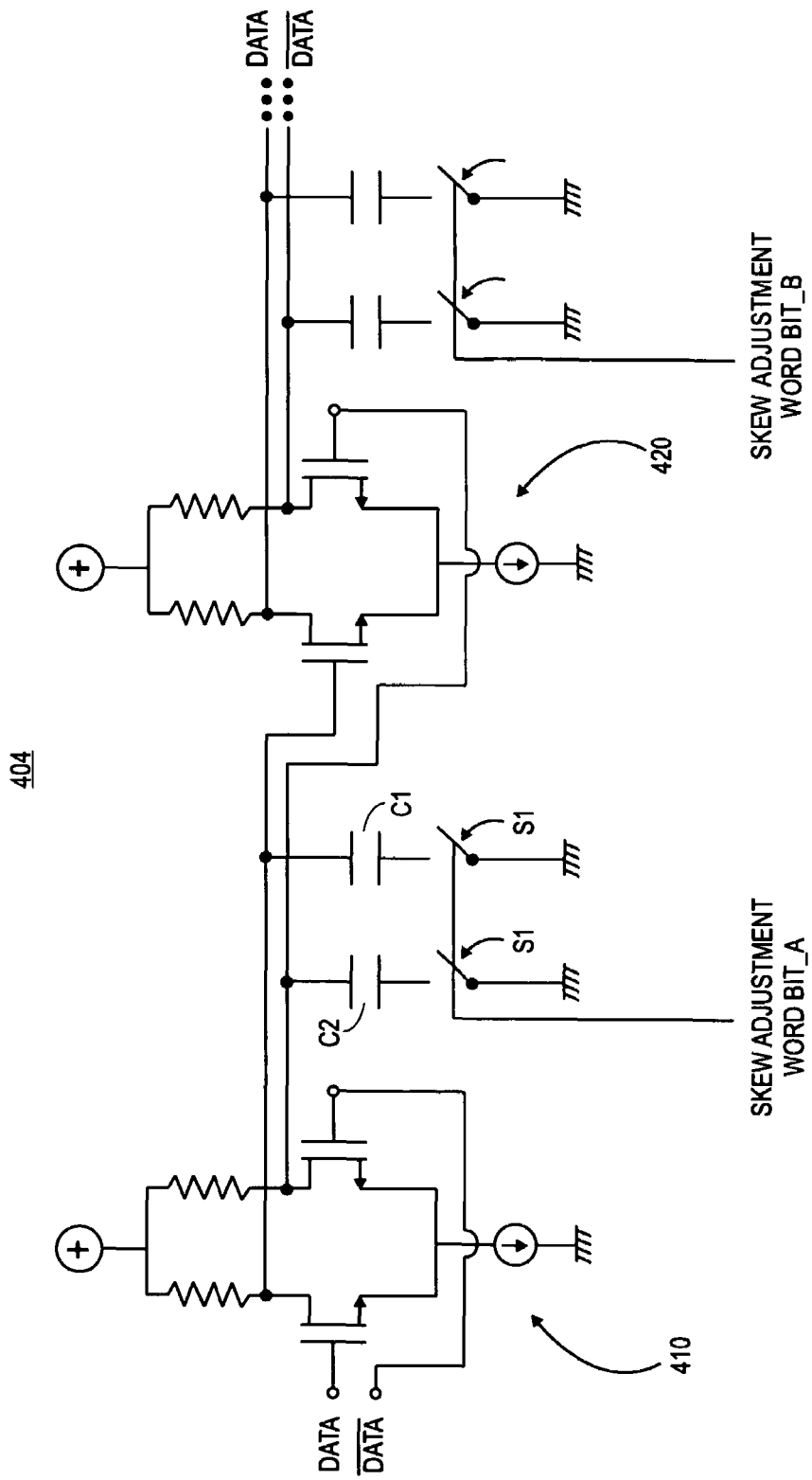
FIG. 4 shows an embodiment for the programmable delay unit of FIG. 3.

FIG. 4 shows an embodiment 404 of a programmable delay unit that includes a cascade of inverters that each have an adjustable propagation delay. In the embodiment of FIG. 4, the input data signal is a differential signal. The differential input signal is presented to the input of a source coupled FET logic (SCFL) inverter stage 410. Inverter stage 410 drives a second inverter stage 420. Further inverter stages may be cascaded from inverter stage 420.

Note that a capacitance C1, C2 is shunted from each signal line that couples the inverter stages 410, 420. Each capacitance C1, C2 is further coupled to ground via a switch S1, S2. The throw of both switches S1, S2 are coupled such that either both switches S1, S2 are open or both switches S1, S2 are closed. If the switches are closed, additional capacitance C1, C2 is added to the signal lines which increases the delay experienced by the data signals. If the switches S1, S2 are open the capacitance C1, C2 has no effect on the delay experienced by the data signals.

Thus, the propagation delay may be controlled by opening and closing a specific number of switch pairs in the cascade of inverter stages. Maximum delay is exerted on the data signals if all switches are closed. Correspondingly, minimum delay is exerted on the data signals if all switches are open. The position of each pair of switches (i.e., open or closed) is determined by the value of a skew adjustment word bit.

For example, if the skew adjustment word bit "A" is a "1" the switches S1, S2 are open while if the skew adjustment word bit "A" is a "0" the switches S1, S2 are closed. The position of each pair of switches within the cascade of inverter stages is controlled by a different skew adjustment word bit. Thus, different delays through the programmable delay unit 404 may be crafted with different skew adjustment word values. In an alternate embodiment, a cascade of inverters may be employed having a fixed propagation delay where the value of the skew adjustment word controls how many of the inverters the signal flows through. As the signal flows through more inverters, the delay increases (and as the signal flows through less inverters, the delay decreases).

Figure 5:
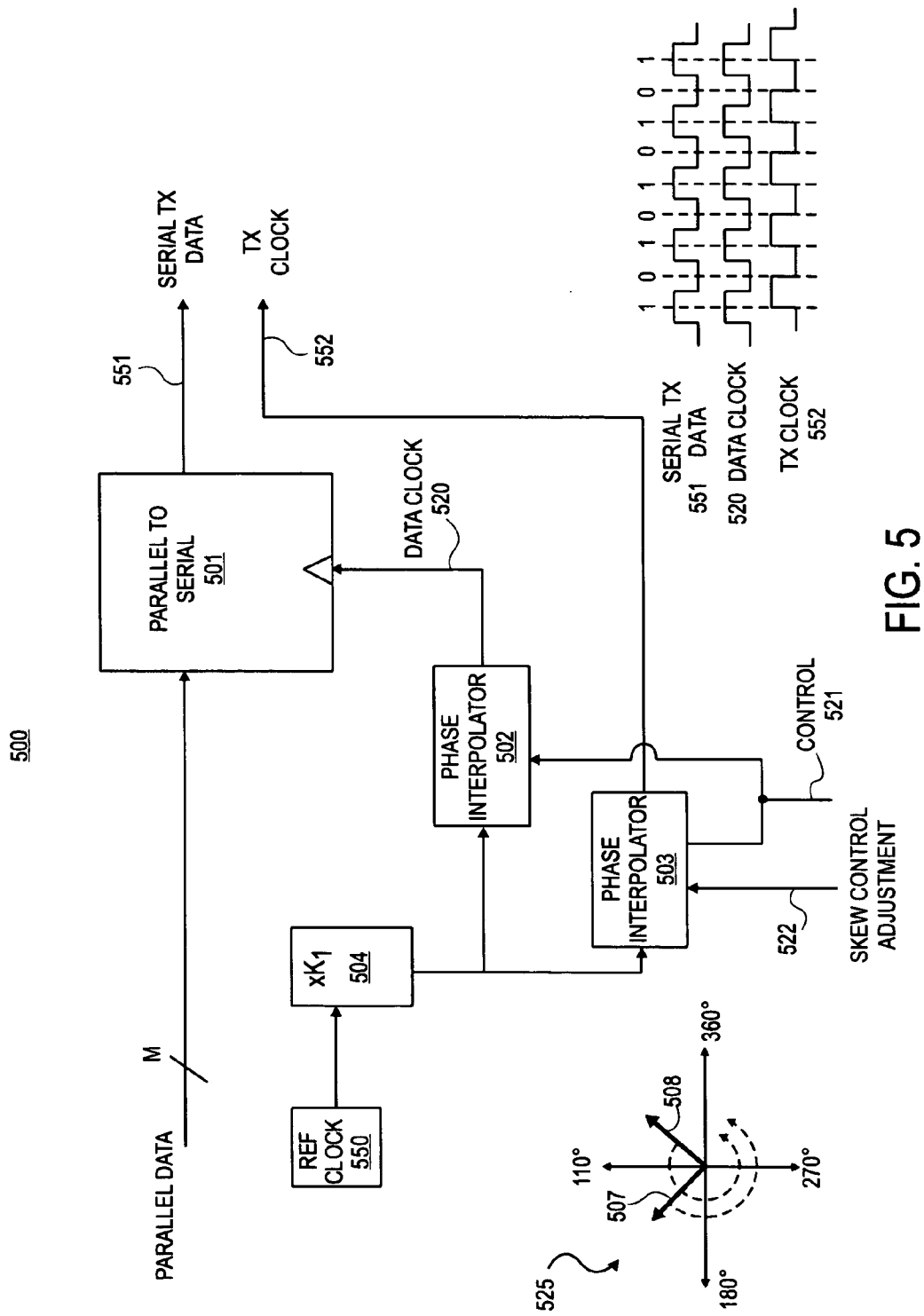
FIG. 5 shows an embodiment for a transmitting unit having a programmable phase interpolator.

FIG. 5 shows another alternative embodiment 500 that provides for programmable skew adjustment. The design of FIG. 5 may be used in networking applications to time the clocking of a serial link with a clock located on the transmitting end of a network. That is, for example, the parallel data may be received from a network such as a 1.00 Gb/s Ethernet network and the serial tx data 551 shown as the output of FIG. 5 is clocked according to a clock that is effectively received from the data being received on the network.

A network interface such as a physical layer (PHY) presents the serial link circuitry 500 with data received from the network. The PHY formats the data received from the network into a parallel data stream "parallel data" and also provides a receive clock (not shown in FIG. 5) that is: 1) extracted from the data received on the network; and 2) properly times the byte-wide data received from the PHY (e.g., a 125 Mhz clock for a byte wide of data having a 1 Gb/s data rate). Reference clock 550 ("Ref clock"), in an embodiment, is a local oscillator used as a reference from which a transmit clock for the PHY is derived and from which a serial received clock from the PHY is generated as described in more detail below.

The parallel to serial converter 501 converts the parallel data into serial data (i.e., "serial tx data"). The parallel to serial converter embodiment 501 of FIG. 5 employs a double edged transmission approach where a next serial tx data signal 551 value is effectively triggered upon both edges of a data clock signal 520 cycle. Note that, in the approach of FIG. 5, the maximum data rate of the serial tx data signal 551 corresponds to the frequency of the tx clock signal 552 and the data clock signal 520.

Figure 1:
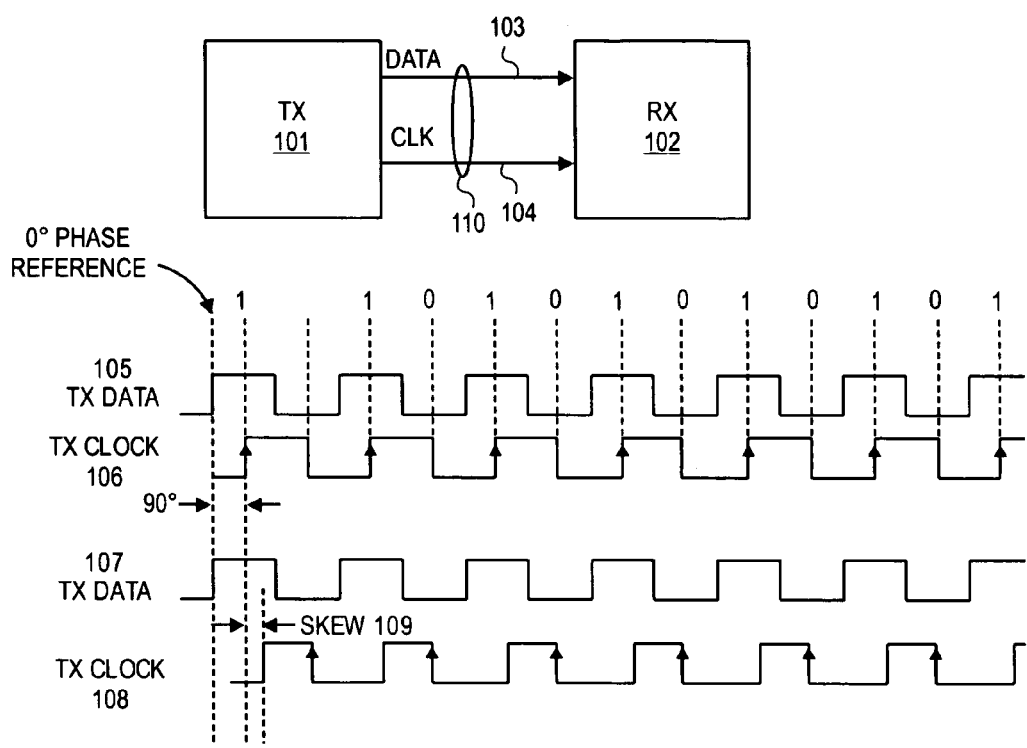
FIG. 1 shows a serial interface.

That is, for a "101010 . . ." tx data pattern (as seen in FIG. 5), a new serial tx data signal 551 value is observed for each edge of the data clock signal 520 (as opposed to half of the edges as seen in FIG. 1). This corresponds to a 1.25 Gb/s serial tx data signal 551 for a 625 Mhz data clock signal 520 and tx clock signal 552 (because there are two serial data bits per clock cycle). Note that, in this embodiment, the parallel to serial converter 501 employs an encoding scheme (e.g., 8B/10B or 4B/5B) that effectively boosts the line speed beyond the actual data rate received from the network (e.g., 1 Gb/s data rate is boosted to a 1.25 Gb/s serial tx data signal baud rate).

In the embodiment of FIG. 5, the data clock 520 and tx clock 552 are both higher frequencies than the ref clock 550. That is, the ref clock 550 is effectively multiplied by a factor of "K1" by a frequency multiplier 504 before being delivered to a pair of phase interpolator units 502, 503. In an embodiment, frequency multiplier 504 is a phase lock loop circuit.

A phase interpolator is a circuit that can adjust the phase of a signal by 360 degrees or more per second which effectively adds to the frequency of the signal. For example, if a 1 kHz signal is provided to a phase interpolator that adds 720 degrees of phase shift to the signal per second, the phase interpolator output corresponds to a 1.002 kHz signal because 720 degrees of phase shift per second corresponds to an extra 2 Hz added to the frequency of the signal.

The increase in frequency to the ref clock 550 is provided by operation of the frequency multiplier 504 (which multiplies the ref clock 550 by a fixed amount K1). The pair of phase interpolators 502, 503 adjust the increased frequency by a variable amount depending on the phase interpolator control input 521 (which controls the amount of phase adjustment in units of degrees/sec).

In an embodiment, the phase interpolator control input 521 is controlled by a circuit (not shown in FIG. 5 for simplicity) that is coupled to the network line from which the parallel data is first received. Via feedback (which is also not shown in FIG. 5 for simplicity) from the output of one or both of the phase interpolators 502, 503, the phase interpolator control input 521 stabilizes when the divided down frequency of the phase interpolator output signals (data clock 520, tx clock 552) approximately "matches" the frequency of the receive data frequency from the PHY (e.g., a 625 Mhz interpolator output frequency divided by 5 corresponds to a 125 Mhz PHY receive clock for a byte wide of data having a 1 Gb/s data rate).

As such, the data clock signal 520 and the tx clock signal 552 have a frequency that corresponds to a received clock from the network. A first phase interpolator 502 helps generate the data clock 520 signal used by the parallel to serial converter 501 to time the transmission of the serial tx data 551. The second phase interpolator 503 helps generate the tx clock 552 that is sent along with the serial tx data.

The second phase interpolator 503 has a skew control adjustment 522 that controls an offset between the phase adjustment performed by the first phase interpolator 502 and the phase adjustment performed by the second phase interpolator 503. For example, referring to the phase diagram 525 of FIG. 5, phasor 507 corresponds to the phase adjustment performed by the first phase interpolator 502 and phasor 508 corresponds to the phase adjustment performed by the second phase interpolator 503. The rate of the counterclockwise spin of the phasors is controlled by the phase interpolator control input 521 (which, again, corresponds to the phase adjustment measured in degrees/sec). Since the rate of both phasors 507, 508 is controlled by the same input 521, the pair of phase interpolators 502, 503 increase the frequency of their corresponding input signals by the same amount.

Note that the phasors 507, 508 have a phase offset of 90 degrees with respect to one another. As a result of this phase offset, the data clock 520 and tx clock 552 (as seen in the waveform diagrams of FIG. 5) have a 90 degree phase offset with respect to one another. This sets the proper nominal phase relationship between the serial tx data and the tx clock. This nominal phase difference of 90 degrees may be designed into the phase interpolators 502, 503 themselves (i.e., phase interpolator 503 by design has a 90 degree offset with respect to phase interpolator 502).

The skew control adjustment 522 of the second phase interpolator 503 adjusts this nominal phase offset of its corresponding phasor 508 and, as such; may be used to apply the desired skew between the serial tx data and the tx clock as discussed with respect to FIG. 2. The value of the skew control adjustment 522 input may be programmably controlled so that a desired skew can be programmed as discussed above. In a further embodiment, the frequency multiplier 504 output is "tapped" to generate a local transmit clock for the network PHY.

Note also that embodiments of the present description may be implemented not only within a semiconductor chip but also within machine readable media. For example, the designs discussed above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behaviorial level netlist, a register transfer level (RTL) netlist, a gate level netlist and a transistor level netlist. Machine readable media also include media having layout information such as a GDS-II file. Furthermore, netlist files or other machine readable media for semiconductor chip design may be used in a simulation environment to perform the methods of the teachings described above.

Thus, it is also to be understood that embodiments of this invention may be used as or to support a software program executed upon some form of processing core (such as the CPU of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
   (a) measuring a skew between a data signal and a clock signal at a receiving side of a serial link implemented with a first semiconductor chip;
   (b) programming a phase relationship into a second semiconductor chip; and,
   (c) adjusting a phase relationship between said data signal and said clock signal to reduce said skew, wherein said adjusting of said phase relationship occurs at a transmitting side of said serial link implemented with said second semiconductor chip.

2. The method of claim 1 further comprising receiving said measured skew at a skew adjustment unit implemented with said second semiconductor chip, and determining said phase relationship before said adjusting a phase relationship.

3. The method of claim 1 wherein said adjusting a phase relationship further comprises imposing a delay on at least one of said signals.

4. The method of claim 3 wherein said adjusting a phase relationship further comprises imposing a delay on both of said signals.

5. The method of claim 1 wherein said adjusting a phase relationship further comprises adjusting a phase offset between a pair of phasors associated with a pair of phase interpolators, a first of said phasors used to derive a second clock signal that times the transmission of said data signal, a second of said phasors used to derive said clock signal.

6. An apparatus, comprising:
   (a) a transmitter coupled to a receiver by a serial link, said serial link comprising a clock signal line and a data signal line to transport a clock signal and a data signal;
   (b) a programmable delay unit within said transmitter, said programmable delay unit coupled to said skew adjustment circuitry, said programmable delay unit having an output node to provide one of said signals;
   (c) skew measurement circuitry coupled to said serial link, said skew measurement circuitry coupled to said serial link closer to said receiver than said transmitter, said skew measurement circuitry to measure a skew between said clock signal and said data signal, said skew measurement circuitry implemented with a first semiconductor chip; and
   (d) skew adjustment circuitry coupled to said skew measurement circuitry and said transmitter, said skew adjustment circuitry to adjust said skew at a transmitting side of said serial link in response to a signal from said skew measurement circuitry, said transmitter and said skew adjustment circuitry implemented with a second semiconductor chip.

7. The apparatus of claim 6 further comprising a second programmable delay unit within said transmitter, said second programmable delay unit coupled to said skew adjustment circuitry, said second programmable delay unit having an output node to provide another of said signals.

8. The apparatus of claim 6 wherein said programmable delay unit further comprises a cascade of inverters.

9. The apparatus of claim 8 wherein each of said inverters within said cascade of inverters has an adjustable propagation delay.

10. The apparatus of claim 6 wherein transmission of said data signal is timed according to a phase interpolator output signal.

11. The apparatus of claim 6 wherein said clock signal is derived from a phase interpolator output signal.

12. The apparatus of claim 11 wherein said phase interpolator further comprises a skew control input that adjusts a phasor phase offset, said skew control input coupled to said skew adjustment circuitry.

13. The apparatus of claim 6 wherein said skew adjustment circuitry further comprises a CPU.

14. An apparatus, comprising:
   (a) a network interface coupled to a transmitter;
   (b) a receiver coupled to said transmitter by a serial link, said serial link comprising a clock signal line and a data signal line to transport a clock signal and a data signal, said receiver implemented with a first semiconductor chip;
   (c) skew measurement circuitry coupled to said serial link, said skew measurement circuitry implemented with said first semiconductor chip and,
   (d) skew adjustment circuitry coupled to said skew measurement circuitry and said transmitter, said skew adjustment circuitry to adjust said skew at a transmitting side of said serial link in response to a signal from said skew measurement circuitry, said skew adjustment circuitry including a programmable phase relationship, said skew adjustment circuitry and said transmitter implemented with said second semiconductor chip.

15. The apparatus of claim 14 wherein transmission of said data signal is timed according to a phase interpolator output.

16. The apparatus of claim 14 wherein said clock signal is derived from a phase interpolator output.

17. The apparatus of claim 16 wherein said phase interpolator further comprises a skew control input to adjust a phasor phase offset, said skew control input coupled to said skew adjustment circuitry.

18. The apparatus of claim 14 wherein said skew adjustment circuitry further comprises a CPU.

19. The apparatus of claim 14 wherein said transmitter further comprises a parallel to serial converter to craft said data signal, said parallel to serial converter coupled to said network interface to receive parallel data.

20. The apparatus of claim 14 wherein said network interface corresponds to a physical layer.

21. The apparatus of claim 14 wherein said network interface corresponds to a media access control layer.

22. A semiconductor chip comprising:
   a) a serial link transmitter comprising a serial clock signal output and a serial data signal output, said serial link transmitter comprises a programmable delay unit having an output node from which said serial link clock signal flows;
   b) skew adjustment circuitry coupled to said serial link transmitter, said skew adjustment circuitry to adjust a skew between said serial clock signal and said serial data signal, said skew adjustment circuitry comprising an input node to receive an indication of said skew from another semiconductor chip.

23. The semiconductor chip of claim 22 wherein said programmable delay unit comprises a cascade of inverters.

24. The semiconductor chip of claim 22 wherein said transmitter comprises a phase interpolator to time the transmission of said data signal.

25. The semiconductor chip of claim 22 wherein said transmitter comprises a phase interpolator to time the transmission of said clock signal.

* * * * *